United States Patent
Kothari

(10) Patent No.: US 9,637,965 B1
(45) Date of Patent: May 2, 2017

(54) PROACTIVE VEHICLE DOORS TO PREVENT ACCIDENTS

(71) Applicant: Ankit Dilip Kothari, Henrico, VA (US)

(72) Inventor: Ankit Dilip Kothari, Henrico, VA (US)

(*) Notice: Subject to any disclaimer, the term of this patent is extended or adjusted under 35 U.S.C. 154(b) by 0 days.

(21) Appl. No.: 15/269,941

(22) Filed: Sep. 19, 2016

Related U.S. Application Data

(60) Provisional application No. 62/256,707, filed on Nov. 18, 2015.

(51) Int. Cl.
- *B60R 22/00* (2006.01)
- *E05F 15/40* (2015.01)
- *B60J 5/04* (2006.01)
- *E05F 15/76* (2015.01)

(52) U.S. Cl.
CPC ............ *E05F 15/40* (2015.01); *B60J 5/0493* (2013.01); *E05F 15/76* (2015.01); *E05Y 2400/54* (2013.01); *E05Y 2900/531* (2013.01)

(58) Field of Classification Search
USPC .......................................................... 701/49
See application file for complete search history.

(56) References Cited

U.S. PATENT DOCUMENTS

| | | | |
|---|---|---|---|
| 7,175,227 B2* | 2/2007 | Menard | E05F 15/43 296/146.1 |
| 8,091,280 B2* | 1/2012 | Hanzel | B60R 25/2054 296/146.4 |
| 8,650,799 B2* | 2/2014 | Chen | E05F 15/43 296/146.1 |
| 8,958,948 B2* | 2/2015 | Lange | E05B 81/64 701/36 |
| 2005/0280284 A1* | 12/2005 | McLain | B60R 13/043 296/146.1 |
| 2008/0030045 A1 | 2/2008 | Lai | |
| 2008/0296927 A1* | 12/2008 | Gisler | E05F 15/43 296/146.4 |
| 2008/0307711 A1 | 12/2008 | Kern | |
| 2011/0260848 A1* | 10/2011 | Rodriguez Barros | B60Q 1/2665 340/438 |

* cited by examiner

*Primary Examiner* — Hussein A. Elchanti
(74) *Attorney, Agent, or Firm* — James M. Smedley LLC; James Michael Smedley, Esq.

(57) ABSTRACT

This solution will help to detect oncoming traffic and/or nearby external objects when the vehicle door is being opened, and it would automatically stop the vehicle door from opening further if there is a possibility of an accident involving the vehicle doors or its users. This solution will notify vehicle users using an indicator on the vehicle door and/or an existing notification systems in vehicle that vehicle door has been restricted from opening further due to potential of an accident. This invention also has an external alert mechanism, which would generate alert externally that vehicle door is about to be opened, and therefore, help to prevent accidents. This invention will also comprise of an artificial intelligence module within the proactive vehicle door system, where such module would constantly gather data, analyze and provide proactive suggestions or even take necessary actions in order to help prevent any vehicle door related accidents.

28 Claims, 4 Drawing Sheets

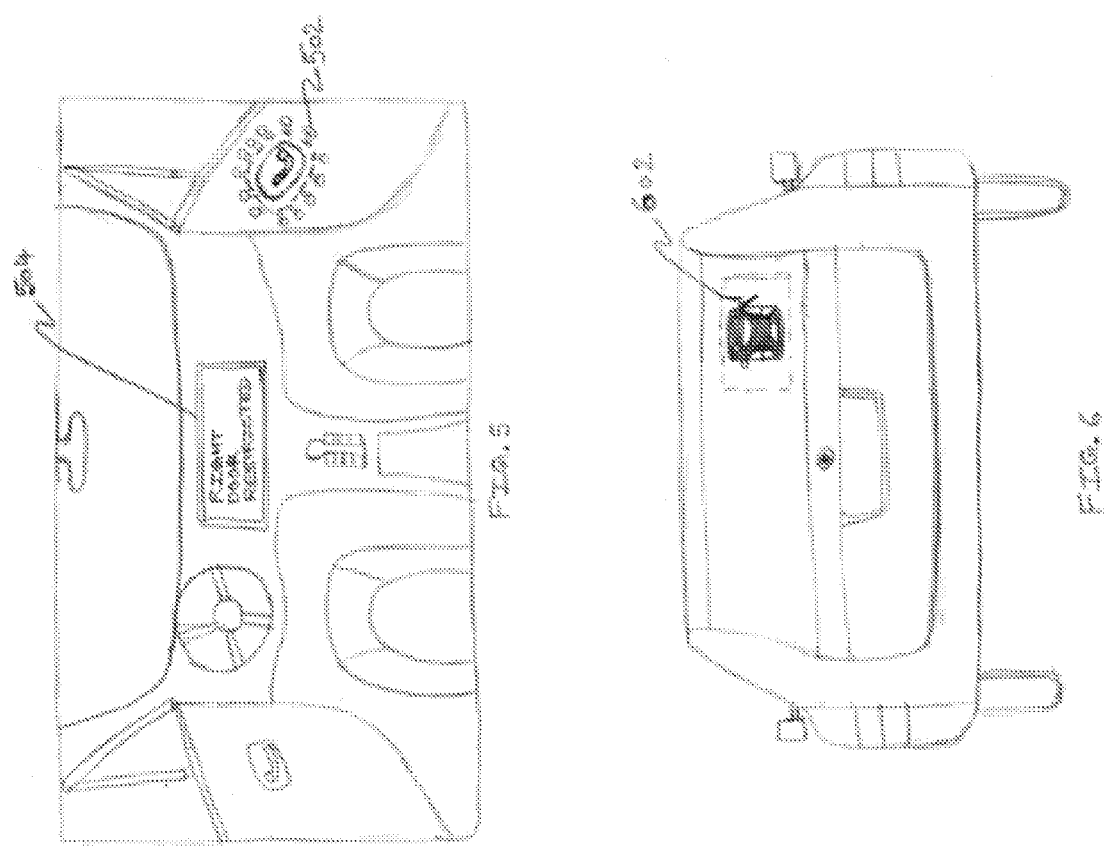

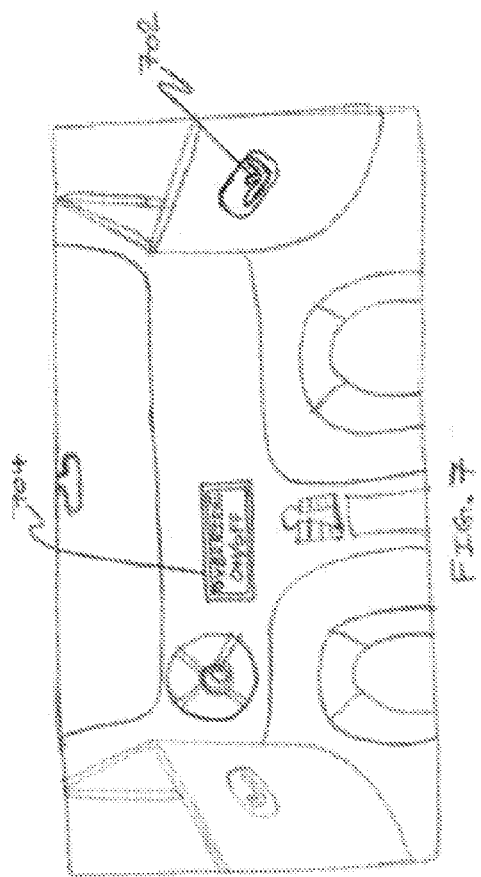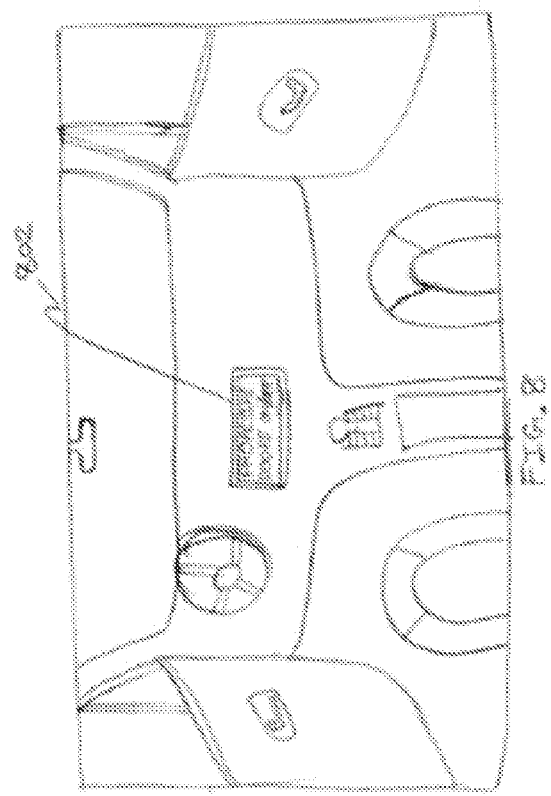

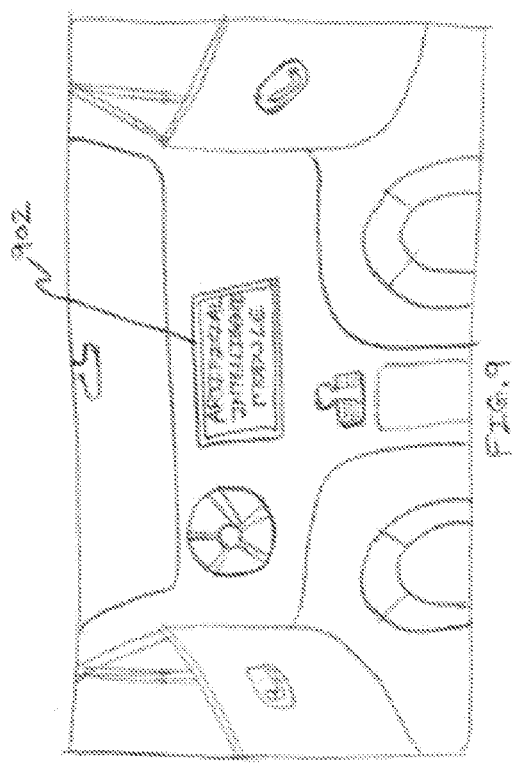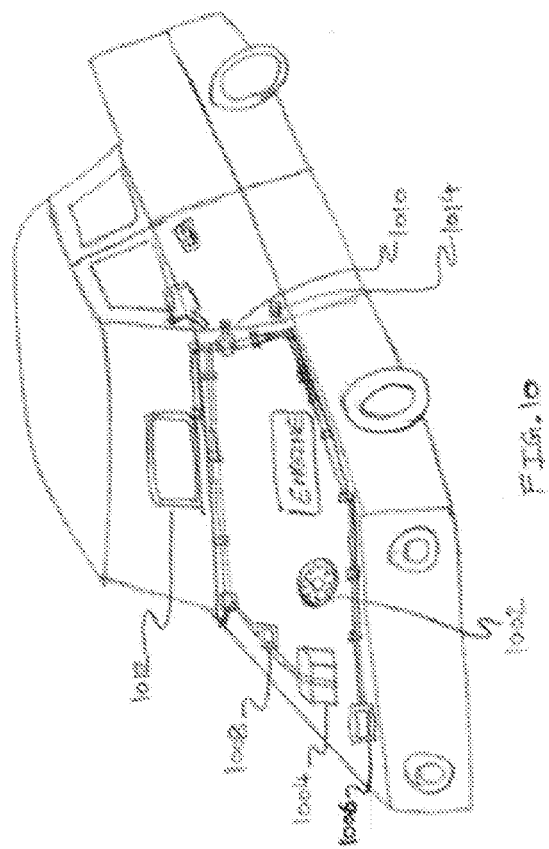

PROACTIVE VEHICLE DOORS TO PREVENT ACCIDENTS

CROSS-REFERENCE TO RELATED APPLICATIONS

This application claims benefit of priority to U.S. Provisional Patent Application Ser. No. 62/256,707, entitled "Proactive Vehicle Doors to Prevent Accidents" filed on Nov. 18, 2015, the contents of which are incorporated herein by reference in its entirety.

BACKGROUND

It often occurs that when a vehicle door is opened without paying close attention to the oncoming traffic (for example: another vehicle, cyclist, motorbike, scooter, people, etc), then there is a potential of an accident if the traffic either coming from behind or even from the front come and hit that open vehicle door. In this situation, there is also a risk of the user themselves getting hit by traffic if they weren't paying attention while opening their vehicle door.

In addition to above, it also often occurs that when a vehicle user opens their vehicle door without paying close attention to the external objects, then there is a potential for an accident as that vehicle door can hit the external objects (for example: another vehicle parked in parking lot, building wall if vehicle was parked next to building wall, road sign pillar/pole, water hydrant, etc). To further explain this problem, let's take the example of the parking lots. It's quite common in the parking lots for the vehicle doors to hit other vehicles while the user is either trying to get in or get out of their vehicle.

Overall, the vehicle door related accidents are increasing more and more, and can result in dents and damages on the vehicle itself as well as other external objects/vehicles. In addition, there are costs involved to fix those dents/damages, rise in insurance premiums occur due to such accidents, and so on. In fact, in some cases, people even run away after they hit another vehicle with their vehicle door without reporting those accidents resulting in hit and run cases. Also, currently there is no indicator on the vehicle notification system or the vehicle doors itself to indicate to the vehicle door operators that there is a risk of an accident when there are external objects or oncoming traffic. Also, currently there isn't any type of external alert mechanism (for example: an indicator, notification, digital display, lights, etc) to external/outside people, oncoming traffic or nearby external objects that the vehicle door is about to be opened, which can provide an alert to those external things and help to prevent accidents. In addition, currently there also isn't an artificial intelligence module for the proactive vehicle doors that would constantly gather, analyze and provide proactive suggestions or even take the necessary actions in order to help prevent any vehicle door related accidents.

However, any of these vehicle door related accidents can be prevented if the vehicle doors have a mechanism for external object identification and proactive self-stopping and notification system such that the vehicle doors would automatically stop from opening further after a certain point when there is a risk of oncoming traffic hitting the door or another external object hitting the vehicle door. Also, if an indicator was present on the vehicle notification system and/or on the vehicle doors itself that shows when it's safe to open the door, that would also help to prevent any vehicle door related accidents. Also, if an external alert mechanism (for example: an indicator, notification, digital display, lights, etc) was present on the vehicle, then it would alert the external/outside people, oncoming traffic and external objects, and that would also help to prevent accidents. In addition, if an artificial intelligence module related to the vehicle doors was present, then it would constantly gather, analyze and provide proactive suggestions or even take the necessary actions in order to help prevent future accidents.

BRIEF SUMMARY

This solution will help to detect oncoming traffic and/or nearby external objects when the vehicle door is being opened, and it would automatically stop the vehicle door from opening further if there is a possibility of an accident involving the vehicle doors or its users. Note: oncoming traffic can be anything that can cause damage to the vehicle door, such as, another vehicle, cyclist, people, motorbike, scooter, etc that are either coming from front or from behind. Note: an external object can also be anything that can cause damage to the vehicle door. For example: another vehicle parked in parking lot, building wall if vehicle was parked next to building wall, road sign pillar/pole, water hydrant, etc. This solution will help to prevent accidents and also indirectly remove the fear from the vehicle users that they might hit another object while opening their vehicle doors and vice versa. Note: Even in those situations when the vehicle door hasn't even been opened at all, however, if the user has indicated their intent to open the door (for example: hold the vehicle door handle, etc), then the solution would detect that (for example: using sensors within the vehicle door handle, etc) and still proactively stop the doors from opening at all or even lock the doors in order to try and prevent an accident involving the vehicle doors.

In case of self-driving vehicles, when the vehicle door hasn't been opened, however, if the self-driving vehicle is about to open the door i.e. intends to open the door, then the self-driving vehicle would communicate that information to the vehicle computer, which would proactively stop the doors from opening at all or even lock the doors if there is a detection of potential accident involving the vehicle doors.

This invention will also notify the vehicle users using an indicator on the vehicle door and/or an existing notification systems in the vehicle that the vehicle door has been restricted from opening further due to the potential of an accident. Also, this invention will also have an external alert mechanism (for example: using an indicator, notification, digital display, lights, etc) that would alert the external/outside people, oncoming traffic or nearby external objects that the vehicle door is about to be opened, which would also help to prevent accidents. In addition, this invention will also comprise of an artificial intelligence module within the proactive vehicle door system, where the module would constantly gather and analyze i.e. learn from the regular actions of the users related to the vehicle doors (such as incorrectly opening the vehicle door at a particular time of the day, or at a particular place, or in a particular sequence of actions, etc), and then it would proactively inform the user or users to avoid making those same mistakes again, and therefore, help to prevent future accidents.

The present invention can use sensors to identify when the vehicle user is about to open the vehicle door, or to identify the external objects or oncoming traffic, and provide a self-stopping feature on the vehicle doors that can help to prevent accidents.

While the illustrated system is primarily directed as original built-in equipment on a vehicle, it is within the spirit and scope of the invention to be able to retrofit the disclosed system on existing vehicles as well.

Note: Any of the above mentioned features on the system are just for exemplary purposes, however, as technology advances in future, additional options can be added to this system to enhance the use of such self-stopping feature on the vehicle doors to prevent accidents.

Any components of the system described above would continue to work/function even when the vehicle isn't turned on i.e. the system would run using the vehicle's built-in rechargeable battery in this case.

One or ordinary skill in the art would recognize that this invention would be applicable to not only the vehicle doors of traditional vehicles, but also semi-autonomous vehicles as well as autonomous self-driving vehicles and that would be within the spirit and scope of the present invention. In other words, this invention would be applicable to any type of vehicles that have doors or an opening to be able to come out of the vehicle. In addition, whether it's the user of the vehicle who opens or closes the door or the software module that opens or closes the door automatically based on user input or the autonomous self-driving vehicle's instructions, all of those situations would be valid and considered within the spirit and scope of the present invention.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings.

BRIEF DESCRIPTION OF THE DRAWINGS

FIG. 5 illustrates an exemplary internal notification system, for example: centrally on the vehicle dashboard as well as individually by lighting the handle of the vehicle door itself, notifying the vehicle user/s that the vehicle door has been restricted from opening further due to the potential of an accident. Note: This illustration is just exemplary, and any other way of internally notifying the vehicle user about the vehicle door would also be within the spirit and scope of present invention.

FIG. 6 illustrates an exemplary external alert mechanism/system, for example: a digital display on the rear windshield, where the proactive vehicle door system of the vehicle would be able to use the external alert mechanism/system to alert the external/outside people, oncoming traffic or nearby external objects that the vehicle door is about to be opened, and therefore, help to prevent accidents. Note: This illustration is just exemplary, and any other way of externally notifying that the vehicle door is about to be opened would also be within the spirit and scope of present invention.

FIG. 7 illustrates exemplary on/off switch or mechanism to be able to activate or deactivate the manual override function of the proactive vehicle door system. For example, as illustrated in the diagram, the manual override function can be in the form of central button available on the dashboard, which when turned on i.e. activated, would no longer stop any of the vehicle doors from opening based on the sensor detection. Another example of the manual override function can be a button or manual trigger available on the door that allows the user of that door to active or deactivate the vehicle door's manual override function. As illustrated in the diagram, an exemplary small handle is provided right behind the vehicle door handle, where a user can put a couple of their fingers on the small handle and couple of fingers on the big handle, and then pull both those handles present on the vehicle door at the same time to activate the manual override function of the vehicle, and therefore, further open the vehicle door.

FIG. 8 illustrates exemplary on/off switch to be able to activate or deactivate the entire proactive vehicle door system. When the switch is turned on, then the proactive vehicle door system is activated and would prevent the vehicle doors from potential accidents. When the switch is turned off, then the proactive vehicle door system is deactivated and would no longer restrict the vehicle doors from opening further even if there is a potential for an accident.

FIG. 9 illustrates an exemplary display associated with the artificial intelligence module available within the proactive vehicle door system. Such artificial intelligence module would constantly gather and analyze i.e. learn from the regular actions of the users related to the vehicle doors and then it would proactively inform the user or users to avoid making those same mistakes again in future, and therefore, help to prevent future accidents.

FIG. 10 is a diagram of exemplary power connection from the vehicle's power system to any of the components of the proactive vehicle door system.

The disclosure and its various embodiments can now be better understood by turning to the following detailed description of the preferred embodiments. It is expressly understood that the embodiments as defined by any current or future claims may be broader than the illustrated embodiments described below.

DETAILED DESCRIPTION

Figure 2:
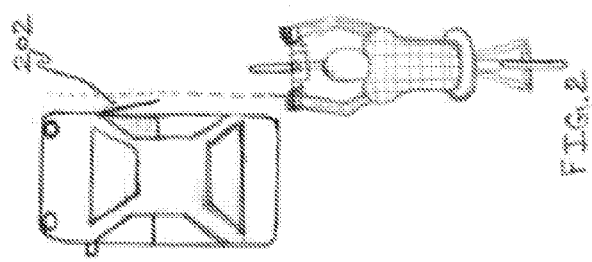
FIG. 2 is a diagram illustrating a door being opened for a vehicle where a cyclist is coming from behind at the same time. This diagram illustrates that the proactive vehicle door system has restricted the vehicle door from opening further after a certain point since there is a potential for an accident due to oncoming traffic i.e. a cyclist along with their cycle in this situation.
Figure 4:
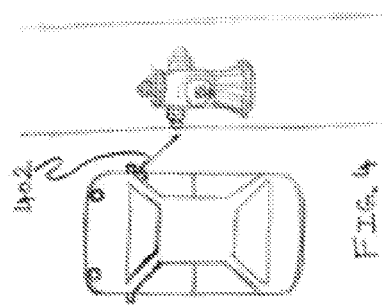
FIG. 4 is a diagram which illustrates a vehicle parked on the street and that its proactive vehicle door system has restricted the vehicle's door from opening further after a certain point since there is a potential for an accident due to nearby external object i.e. a fire hydrant in this situation.
Figure 1:
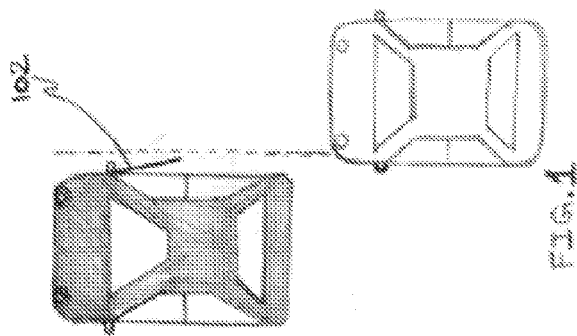
FIG. 1 is a diagram illustrating a door being opened for a vehicle where another vehicle is coming from behind at the same time. This diagram illustrates that the proactive vehicle door system has restricted the front vehicle's door from opening further after a certain point since there is a potential for an accident due to oncoming traffic i.e. another vehicle in this situation.
Figure 3:
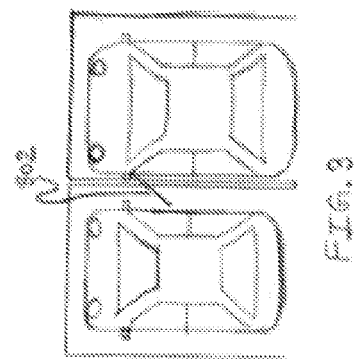
FIG. 3 displays two vehicles parked closely in a parking lot and one of the vehicle's door is being opened. This diagram illustrates that the proactive vehicle door system has restricted the vehicle door from opening further after a certain point since there is a potential for an accident due to nearby external object i.e. another vehicle in this situation.

As shown in FIG. 1-FIG. 4, this solution will help to detect oncoming traffic and/or nearby external objects when the vehicle door is being opened, and it would automatically stop the vehicle door from opening further 102, 202, 302,

402 if there is a possibility of an accident involving the vehicle doors or its users. Note: oncoming traffic can be anything that can cause damage to the vehicle door, such as, another vehicle, cyclist, people, motorbike, scooter, etc. that are either coming from front or from behind. Note: an external object can also be anything that can cause damage to the vehicle door. For example: another vehicle parked in parking lot, building wall if vehicle was parked next to building wall, road sign pillar/pole, water hydrant, etc. This solution will help to prevent accidents and also indirectly remove the fear from the vehicle users that they might hit another object while opening their vehicle doors and vice versa. Note: Even in those situations when the vehicle door hasn't even been opened at all, however, if the user has indicated their intent to open the door (for example: hold the vehicle door handle, etc.), then the solution would still detect that (for example: using sensors within the vehicle door handle, etc.) and proactively stop the doors from opening at all or even lock the doors in order to try and prevent an accident involving the vehicle doors.

In case of self-driving vehicles, when the vehicle door hasn't been opened, however, if the self-driving vehicle is about to open the door i.e. intends to open the door, then the self-driving vehicle would communicate that information to the vehicle computer, which would proactively stop the doors from opening at all or even lock the doors if there is a detection of potential accident involving the vehicle doors.

According to an embodiment of the invention a vehicle door safety system is provided that includes non-volatile memory for storing computer readable instructions, a plurality of sensors integrated into the vehicle, and a processor configured to receive sensor data about the vehicle's external environment collected by the sensors; identify an object in the vehicle's external environment that represents a potential contact hazard when a vehicle door is opened; determine whether the object is likely to come into contact with the door when the door is opened; and activate a door safety mechanism that prevents the door from extending into contact with the object when the processor determines that the object represents a contact hazard, within a predetermined degree of probability. The degree of probability of contact with the object could be a probability in the range of 0-100%, but is preferably at least 50% or higher. However, one of ordinary skill will appreciate that any degree of probability may be utilized.

One or ordinary skill in the art would recognize that this invention would be applicable to not only the vehicle doors of traditional vehicles, but also semi-autonomous vehicles as well as autonomous self-driving vehicles and that would be within the spirit and scope of the present invention. In other words, this invention would be applicable to any type of vehicles that have doors or an opening to be able to come out of the vehicle. In addition, whether it's the user of the vehicle who opens or closes the door or the software module that opens or closes the door automatically based on user input or the autonomous self-driving vehicle's instructions, all of those situations would be valid and considered within the spirit and scope of the present invention.

As shown in FIG. 5, this solution will also notify the vehicle users using an indicator on the vehicle door 502 and/or an existing notification systems 504 in the vehicle that the vehicle door has been restricted from opening further due to the potential of an accident. Also, as shown in FIG. 6, this invention will also have an external alert mechanism 602 (for example: using an indicator, notification, digital display, lights, etc) that would alert the external/ outside people, oncoming traffic or nearby external objects that the vehicle door is about to be opened, which would also help to prevent accidents.

In addition, as shown in FIG. 9, this invention will also comprise of an artificial intelligence module within the proactive vehicle door system, where the module would constantly gather and analyze i.e. learn from the regular actions of the users related to the vehicle doors (such as incorrectly opening the vehicle door at a particular time of the day, or at a particular place, or in a particular sequence of actions, etc), and then it would proactively inform the user or users to avoid making those same mistakes again, and therefore, help to prevent future accidents.

Note: Whether the vehicle has doors that need to be manually opened by a user or the vehicle has doors that are self-opening automated doors, the solution mentioned here for self-stopping vehicle doors will be applicable in any of those cases.

This solution comprises of one or more sensors for each door of the vehicle, which would detect either the objects that can be potentially hit by the vehicle door while it's opened or those objects that have the potential to come and hit the vehicle door while the vehicle door is being opened. This solution can also comprise of additional sensors that would detect when the vehicle user is about to open the vehicle door. These one or more sensors can be placed in any part of the vehicle, internally or externally, as long as they are placed such that they can gather all the necessary information and send it to the vehicle computer to prevent an accident involving the vehicle doors. For example: the sensor mentioned above can be placed internally or externally on the side mirror assembly, or on the vehicle door itself, or on the external ceiling of the vehicle, etc. One or ordinary skill in the art would recognize that the above mentioned sensor could be placed anywhere in the vehicle without departing from the spirit and scope of the present invention. In addition, one or ordinary skill in the art would also recognize that the sensor or set of sensors can be placed in combination of or solely in any part of the vehicle without departing from the spirit and scope of the present invention.

Such sensors can be either single or a combination of one or more of photo-electric, optic, infrared, radar, sonic, electromagnetic, or any other type of sensors as long as they can do things such as detects the presence of external objects, identify type of external objects, identify shape and/or size of external objects, calculate distance between them and external objects, calculate angle between them and external objects, calculate speed/velocity of external objects coming towards them, calculate time of potential impact from external objects, identify when the user is about to open the door, distinguish external objects as living or non-living objects, and/or gather other necessary information/attributes that can help to prevent an accident. All the information collected by the above mentioned sensors would be constantly sent to the computer/processor of the vehicle that would process that information and further transmit signals to activate or deactivate the automated stopping feature of the vehicle door or doors. One or ordinary skill in the art would recognize that any type of sensor can be used in the vehicle that can gather information and help to prevent an accident, and that would be within the spirit and scope of the present invention. Note: Any of the above mentioned sensors can be installed either internally or externally, however, one or ordinary skill in the art would recognize that even when such sensors are placed behind other objects like metal, etc, they would still continue to function even in those situations.

Note: One of the sensors mentioned above that distinguishes external objects as living or non-living objects would constantly guide (provide the data) for the proactive vehicle door system to act such that when both living and non-living objects have the potential for meeting an accident with the vehicle, then the living objects will be given a preference while preventing any accidents with those living objects as compared to the non-living objects.

When the vehicle door that's being opened reaches close to an external object, then the sensors would inform the vehicle computer to publish a stop message to the vehicle door unit, so the vehicle door would be restricted from opening any further. Such vehicle door can be restricted from opening further in many different ways such as using an automated hook mechanism that inserts its hooks at the designated hole on the vehicle door to stop it from opening further and then unhooks to allow the door to open further. Similarly, a piston can also be used to stop the vehicle door from opening further. Similarly, hydraulic cylinders, automated hinge pin door stop, metal rod door stopper, torsion spring, gears in doors, motor, etc. can also be used to stop the vehicle door from opening further, and so on. One or ordinary skill in the art would recognize that rather than just the examples given above to stop the vehicle door from opening further, any other mechanism can also be used to stop the vehicle door from opening further and that would be within the spirit and scope of the present invention.

As part of this invention, there would also be lasers installed in different parts of the vehicle, which would monitor the surroundings and provide data to the vehicle computer when external objects are identified. Such lasers can be installed either in front, back, sides or top of the vehicle as long as they can monitor the surroundings and provide data to the vehicle computer when external objects are identified.

As part of this invention, there would also be object detection software module within the vehicle computer, which would use one or more cameras installed in the vehicle to capture surrounding external image outside of the vehicle, and would constantly try to detect objects in the image that can potentially cause an accident involving vehicle doors. The said cameras can be installed anywhere inside or outside the vehicle as long as they can capture the surrounding images outside of the vehicle.

Note: Whenever a specific door has been restricted from opening further to prevent an accident, a message would also be displayed on the vehicle notification system (for example: on the vehicle dashboard, or Heads up display, or any other display/audio system in the vehicle) that the door has been restricted from opening further. Also, there can be some type of indicator (for example: a light surrounding the door handle or the door support handle, etc), which will initially continue to display green color to indicate no issues while the door is being opened, but will change to red color when that door has been restricted from opening further to prevent an accident. These features will clearly indicate to the vehicle door operator when it's safe to further open the door and when it isn't. Please note that the indicator about the door being restricted from opening isn't just limited to the green or red lights and too on the door handles, and in fact, it can be any other type of indicator as long as it can convey to the vehicle door operator that the door has been restricted from opening as there can be a potential for accident. (Note: An accident mentioned above can be any type of accident where one vehicle door hits another vehicle or any other object, or it can also be another vehicle or traffic comes and hits the open door of a vehicle, or another type of accident involving a vehicle door, etc.)

Note: In this case, if the external object or oncoming traffic (for example: another vehicle) moves away from its previous location and there is no other object remaining nearby to the opening vehicle door, then the sensor would immediately inform the vehicle computer to publish a 'release' message to the vehicle door unit, so that the vehicle door unit would no longer be restricted and can be opened further as needed.

Even though a vehicle door automatically stops from opening further based on the sensor detection of an external object, there would still be an option for the vehicle user(s) to override that function and manually open the vehicle door further if they wish to do so (this feature would be further mentioned in the document as the manual override function or manual override mechanism).

For example: there can be an instance where another vehicle or traffic is coming from behind or someone (living being like a human, dog, etc) is standing outside the vehicle door, so in that case, the sensors would detect them and restrict the door from opening further. However, in any of those situations, a manual override function would be helpful, where a vehicle user would activate the manual override function and open the vehicle door a little bit to indirectly indicate to the externally present objects (note: those objects that have ability to understand intent) that the vehicle user wants to come out of the vehicle.

On the other hand, there can be an additional feature on the vehicle doors where if an individual is standing outside the vehicle and are also holding the vehicle door handle from outside, then the sensors within the vehicle door's external handle would detect that behavior and the system itself would no longer restrict the vehicle door from opening since the external person is anyways indicating that they also want to open the vehicle door. In other words, there would be no need for the vehicle user to activate the manual override function in this case. Note: However, if the sensors detect other nearby accident prone objects like vehicles, wall, etc, then the door would still automatically stop after reaching the maximum limit so they don't hit those other objects. And in that scenario, manual override function would again be an available option to the users if they still wish to further open the vehicle doors.

Note: One or ordinary skill in the art would recognize that the manual override function can be available in the vehicle in many different ways without departing from the spirit and scope of the present invention and wouldn't be limited to any of the examples given below. For example, as shown in FIG. 7, the manual override function can be in the form of central button available on the dashboard 704, which when activated, would no longer stop any of the vehicle doors from opening based on the sensor detection. Another example of the manual override function can also be a button or manual trigger available on each door that allows the user of that door to active or deactivate the vehicle door's manual override function. For example: as shown in FIG. 7, a small handle 702 can also be provided right behind the vehicle door handle, where a user can put a couple of their fingers on the small handle and couple of fingers on the big handle, and then pull both those handles present on the vehicle door at the same time to activate the manual override function of the vehicle, and therefore, further open the vehicle door.

Note: The manual override mechanism, may be a mechanical button, a software button, an optical sensor, a magnetic switch, a capacitive sensor or any kind of sensor or switch capable of sending a signal or opening or closing a circuit when the user activates it. One or ordinary skill in the art would recognize that any kind of manual override mechanism can be used without departing from the spirit and scope of the present invention. Also, the manual override mechanism can be positioned on the dashboard, on the steering wheel, incorporated into the vehicle's computer user interface, placed in the ceiling, built into the vehicle door itself, built behind the vehicle door handle as a small handle, etc. One or ordinary skill in the art would recognize that the manual override mechanism could be placed anywhere in the vehicle without departing from the spirit and scope of the present invention.

Note: In case if one or more of the sensors isn't able to detect the external object(s) properly or if a sensor isn't working, then it would notify the user in advance. This can be a notification displayed on the vehicle notification system (for example: on the vehicle dashboard, or Heads up display, or any other audio/visual system in the vehicle) that the specific door sensor isn't working properly and therefore the associated door would no longer be automatically restricted from opening due to the sensor problem. One or ordinary skill in the art would recognize that the notification for the sensor not working can be displayed anywhere in the vehicle as long as it's clearly visible to the vehicle users, and that would be within the spirit and scope of the present invention. In addition, there can be some type of indicator (for example: a blinking red light surrounding the door handle or the door support handle, or a sentence 'Sensor not working' Sensor unable to detect objects' highlighted in yellow next to the door handle or the door support handle, etc), which will indicate that the associated door would no longer be automatically restricted from opening due to the sensor problem. In short, any or all of the above mentioned features will clearly indicate to the vehicle door operator that the door would no longer make use of sensors for external object detection. Therefore, they need to be careful while opening the door. One or ordinary skill in the art would recognize that the indicator about the sensor not working isn't limited to the red lights or being on the door handles, and in fact, it can be any other type of indicator in any color and can be placed anywhere in the vehicle as long as it can convey to the vehicle door operator that the object detection sensor isn't working for that door.

It is to be clearly understood that either a single sensor or a plurality of sensors built in or affixed to any part of the vehicle, internally or externally, that can together detect external objects that might hit the vehicle door are within the spirit and scope of the present invention. It is also to be clearly understood that either a single central notification or a plurality of individual notifications can be presented in the vehicle when external objects are detected by sensors that could potentially hit the vehicle door, and that would be within the spirit and scope of the present invention.

Throughout this specification the invention described herein may be referred to as a system, proactive vehicle door system, self-stopping vehicle doors, proactive vehicle doors, self-stopping proactive vehicle doors, or proactive vehicle doors to prevent accidents interchangeably. The user can direct the system to perform various available user actions. Throughout the specification, user actions used to control the system may be referred to as commands, instructions, directions, input, gestures, or actions. These actions may be performed by pressing buttons, turning knobs, moving sliders, touching the touch-sensitive screen of the device, double tapping, dragging, pinching, sliding or any other gestures commonly used to interact with a system. One or ordinary skill in the art would recognize that any user action may be used to interact with the proactive vehicle door system.

Note: This invention also comprises of an artificial intelligence module built within the proactive vehicle door system, where if the vehicle user or users tend to often open the vehicle door or doors without reviewing their surroundings, and the vehicle door is frequently restricted by the system from opening further, then the system can learn from those regular actions of the users (such as incorrectly opening the vehicle door at a particular time of the day, or at a particular place, or in a particular sequence of actions, etc) and then proactively inform the user or users to avoid making those same mistakes again, and therefore, prevent future accidents. For example: If a vehicle user of a parallel parked vehicle regularly tends to open the door incorrectly without checking the surroundings on the street, then the artificial intelligence system would proactively alert that user so they don't make the same mistake again. In the case of self-driving autonomous vehicles, artificial intelligence system would not only proactively alert the user, but also store that incident in the memory of the autonomous vehicle's computer, so the autonomous vehicle's computer would use that information in future to avoid vehicle door related accidents. In the case of vehicles with automatically opening doors, artificial intelligence system would not only proactively alert the user, but also store that incident in the memory of that vehicle computer, so the vehicle's computer would use that information in future to avoid vehicle door related accidents.

Note: This artificial intelligence module of the proactive vehicle door system would also be connected/integrated with the vehicle's overall artificial intelligence module, where both the systems would work closely with each other and help to prevent accidents. For example: If the vehicle's overall artificial intelligence module identifies that the vehicle has been parked outside the parking lines in a parking lot, then it would immediately convey that information to the artificial intelligence module of the proactive vehicle door system, which would further inform the users about the potential of an accident and also go into a heightened alert/watch mode to prevent an accident related to the vehicle doors. In this case, the artificial intelligence module of the proactive vehicle door system would also have the ability to turn on additional sensors, cameras, etc within the vehicle, so they can further assist with the heightened alert/watch mode.

Note: This artificial intelligence module can also comprise of a photo/video capture feature, both internal and external to the vehicle, which would capture the photos/videos of the users' actions while opening the vehicle door and store those photos/videos on the memory of the vehicle's computer. The user/s would then be able to review those photos/videos later using the audio visual component 902 of the vehicle and learn from their previous mistakes to prevent future accidents. Note: there would also be a feature available to manually or automatically upload those photos/videos to a user's pre-defined online location or phone using WI-FI, Bluetooth, etc. In addition, this artificial intelligence module would also comprise of a software module to identify and memorize the users in the vehicle, so even if the users sit in different locations of the vehicle at different times, then the artificial intelligence module would still recognize the users and make suggestions based on that user's previous actions related to the opening of the vehicle door. In short, the artificial intelligence module of the proactive vehicle door system would constantly gather, analyze and provide proactive suggestions or even take the necessary actions in order to help prevent future accidents.

Note: There would also be an option to turn off the artificial intelligence module if the vehicle users do not prefer to get the proactive suggestions to prevent accidents related to the vehicle doors.

As shown in FIG. 8, there would also a feature available to switch on/off 802 i.e. activate or deactivate the proactive vehicle door system for all vehicle doors or for individual vehicle doors. Such mechanism to switch on/off i.e. activate/deactivate the proactive vehicle doors can be done in many ways comprising of either a mechanical button, a software button, an optical sensor, a magnetic switch, a capacitive sensor or any kind of sensor or switch capable of sending a signal or opening or closing a circuit when the user activates it, and so on. In addition, this switch on/off feature to activate or deactivate the proactive vehicle doors can placed anywhere in the vehicle. For example: it can be positioned on the dashboard, on the steering wheel, incorporated into the vehicle's computer user interface, placed in the ceiling, built into the vehicle door itself as a button/switch, built behind the vehicle door handle as a small handle or small switch/button, etc. One or ordinary skill in the art would recognize that such switch on/off feature to activate/deactivate the proactive vehicle door system can be available in the vehicle in many different ways and can be placed anywhere in the vehicle without departing from the spirit and scope of the present invention.

An example of the switch on/off feature of the proactive vehicle door system can be in the form of a central button available on the dashboard, which when activated (turned on), would continue to prevent accidents by automatically stopping any of the vehicle doors from opening further when there is a potential of hitting some external objects. On the other hand, when such switch on/off feature of the proactive vehicle door system is deactivated (turned off), it would no longer restrict any of the vehicle doors from opening further even when there is a potential of hitting some external objects. One or ordinary skill in the art would recognize that rather than limiting the switch on/off feature of the proactive vehicle door system to the central button on the dashboard, any other ways or methods to activate or deactivate the proactive vehicle door system can also be used without departing from the spirit and scope of the present invention.

Another example of being able to switch on/off i.e. activate or deactivate the proactive vehicle door system can be in the form of a button or a manual trigger available on each door that allows the user of that door to individually active or deactivate the proactive vehicle door system for their individual door. One or ordinary skill in the art would recognize that rather than limiting the switch on/off feature of the proactive vehicle door system to a button or manual trigger on individual doors, any other ways or methods to activate or deactivate the proactive vehicle door system can also be used without departing from the spirit and scope of the present invention.

Note: If a vehicle meets with any kind of accident (which can be in any part of the vehicle), and that information was already transmitted to the vehicle computer, then the proactive feature described in this invention about the automatic stopping of the vehicle door from opening further in order to avoid hitting external objects would be immediately deactivated. While the vehicle user/s are already in an accident situation, this automatic deactivating feature would allow the users to be able to immediately get out of the vehicle without worrying or trying to find the manual override function/mechanism (mentioned earlier) to be able to manually open the vehicle door when there are other external objects near the vehicle door.

Note: There would also be an additional water sensor available in the vehicle, which would detect that if the vehicle has partially or fully submerged in water, then in that case also, the proactive feature described in this invention about the automatic stopping of the vehicle door from opening further in order to avoid hitting external objects would be immediately deactivated. While the vehicle is partially or fully submerged in water, this automatic deactivating feature would allow the users to be able to immediately get out of the vehicle without worrying or trying to find the manual override function/mechanism (mentioned earlier) to be able to manually open the vehicle door due to external objects.

According to this invention, a user would also be able to use voice commands instead of operating any of the manual features mentioned in any parts of this invention. For example: using a voice command, a user would be able to activate or deactivate the manual override function of the proactive vehicle door system. In another instance, using a voice command, a user would also be able to activate or deactivate the entire proactive vehicle door system or the individual vehicle doors, and so on. One of ordinary skill in the art would recognize that any mechanically operated feature mentioned in this invention can be replaced with single or a set of voice commands without departing from the spirit and scope of the present invention.

As shown in FIG. 10, the power provided for any components/features of the proactive vehicle door system (for example: to stop and/or release the vehicle doors 1010, audio visual notification systems related to the proactive vehicle doors 1012, entire system on/off switch or individual on/off switches for each vehicle door, activate/deactivate manual override function of the proactive vehicle door system, artificial intelligence module related camera/s, display screen/s and/or notification system, etc) would be provided from the power system of the vehicle mainly comprising of the vehicle's alternator 1002, voltage regulator 1006, the vehicle battery 1004, a battery fuse 1008, a built-in rechargeable battery 1014 on all the individual vehicle doors, and the associated wiring and its harness.

While the vehicle's engine is running, the vehicle's alternator 1002 would supply the necessary power for any components/features of the proactive vehicle door system. However, if the capacity of the alternator 1002 is exceeded, then the vehicle's battery 1004 would supply the necessary power for any components/features of the proactive vehicle door system, even though the vehicle's engine might be running. In this case, it would be indicated to the user using an audio/visual notification system that the vehicle's battery 1004 is being utilized to supply the power for any components/features of the proactive vehicle door system.

If the vehicle's engine isn't running, then the vehicle's battery 1004 would supply the necessary power for any components/features of the proactive vehicle door system. In this case, it would be indicated to the user using an audio/visual notification system that the vehicle's battery 1004 is being utilized to supply the power any components/features of the proactive vehicle door system. However, if the vehicle's battery 1004 is about to fully drain out i.e. no more capacity, then rather than using the vehicle's battery 1004, the proactive vehicle door system would use its built-in rechargeable battery 1014. In this case, it would be indicated to the user using an audio/visual notification system that the rechargeable battery 1014 on the proactive vehicle door itself is being utilized to supply the power for any components/features of the proactive vehicle door system.

According to an embodiment of the present invention, any power that's supplied to the proactive vehicle door system would pass through the voltage regular 1006 to control the amount of voltage passed through. Similarly, there would also be a battery fuse 1008 to protect over current being passed through. Note: It is to be clearly understood that any other mechanisms to control the amount of voltage or current that's passed through to stop or release the proactive vehicle doors would be within the scope and spirit of the invention. According to an embodiment of the present invention, the wiring from the alternator and the battery would run parallel through the sides of the engine, and then from the space/hole available, it would go over to the vehicle doors, which would then also be further extended to the dashboard of the vehicle. Similarly, the associated wiring would also be extended to the rear doors. Note: It is to be clearly understood that there are many different ways to run the wiring from the alternator and the battery to any components/features of the proactive vehicle door system, and that's within the scope and spirit of the invention.

According to an embodiment of the present invention, wiring from the vehicle's alternator 1002 or the battery 1004 can also be extended to the HUD system that's interfaced with the proactive vehicle door system to display the vehicle door related notifications to the user.

Note: It is to be clearly understood that there are many different ways to provide power to any components/features of the proactive vehicle door system including wireless charging, etc., and that's all within the scope and spirit of the invention.

One or ordinary skill in the art would recognize that any method or system of affixing, attaching or mounting the self-stopping feature on the vehicle doors may be used without departing from the spirit and scope of the present invention.

Note: This invention will also have an external alert mechanism (for example: using an indicator, notification, digital display, lights, etc.) that would alert the external/outside people, oncoming traffic or nearby external objects, etc. that the vehicle door is about to be opened, which would also help to prevent accidents. This solution will have the ability to detect that the user intent, or in other words, know that the user is about to open the vehicle door (for example: as soon as the vehicle door is unlocked, or when a user holds the vehicle door handle, or a particular action of user that indicates that the user is about to open the vehicle door, and so on).

One or ordinary skill in the art would recognize that any method or system can be used to detect the user intent that they want to open the vehicle door without departing from the spirit and scope of the present invention. For example: there can be a touch sensor behind the vehicle door handle, which would detect when the user touches the handle and would immediately send that information to the vehicle computer, which would further activate the external alert system to inform externally that the user is about to open the vehicle door. Another example is when the user pushes a button or using a voice command, indicates to the automated vehicle door to open, which would also immediately send that information to the vehicle computer, which would further activate the external alert system to inform externally that the vehicle door is about to open.

In case of self-driving vehicles, when the vehicle door hasn't been opened, however, if the self-driving vehicle is about to open the door i.e. intends to open the door, then the self-driving vehicle would communicate that information to the vehicle computer, which would activate the external alert system to inform the users or other self-driving vehicles externally that the vehicle door is about to be opened.

One or ordinary skill in the art would recognize that the external alert can be displayed anywhere on the vehicle, either internal or external, as long as it is visible externally. For example: external alert can be in the form a digital display inside the rear windshield showing an animated image of vehicle along with its opening door, or there can be another type of external alert present externally on the vehicle, and so on. One or ordinary skill in the art would recognize that the external alert can also be displayed on another display component that's attached to the vehicle, and that would be considered within the spirit and scope of the present invention. For example: there could be an external communication screen attached to the top of the vehicle, especially the self-driving autonomous vehicles, which can also be used to inform external users or other self-driving vehicles that the vehicle's door is about to be opened.

The external alert mechanism/system can be implemented in many different ways. For example: In one instance, the external alert mechanism/system would not depend on the sensors that detect the oncoming traffic or nearby external objects, and would simply activate anytime when the vehicle door is about to be opened. This particular set up of the external alert system itself is sufficient to prevent a lot of accidents involving the vehicle doors by providing the external alerts.

Another instance of the external alert mechanism/system can be implemented such that it would be dependent on the sensors that detect the oncoming traffic or nearby external objects, and only when there is detection of such oncoming traffic or nearby external objects, and if the user decides to open the vehicle door at that time, then the external alert mechanism/system would activate. In other words, this set up of the external alert mechanism/system would activate only when sensors detect potential accident threat rather than activating all the time whenever the vehicle door is opened. One or ordinary skill in the art would recognize that the external alert mechanism/system can be implemented in many different ways rather than limiting it to the examples given above and that would be within the spirit and scope of the present invention.

Note: The external alert mechanism/system can present the alerts in many different ways. For example: there can be LED lights on the vehicle that lit up when the vehicle door is about to be opened, or there can be a display screen at the back and/or front of the vehicle that displays using text, image, etc that the vehicle door is about to be opened, or there can be lights on the edges of the vehicle door itself that would be visible to oncoming traffic and would lit up whenever a vehicle door is about to be opened, and so on. One or ordinary skill in the art would recognize that the external alert mechanism/system can present the alerts externally in many different ways rather than limiting it to any of the examples given above and that would be within the spirit and scope of the present invention.

Note: An additional solution can also be used to prevent vehicle door related accidents involving external objects by covering the vehicle door's extreme end points i.e. points that have the most potential of hitting an external object, with a rubber like product that can reduce the possibility of causing any dents, scratches or other damages to those external objects or the vehicle itself.

Another solution that can also be used to prevent some vehicle door related accidents involving external objects by covering the vehicle door's extreme end points, i.e. points that have the most potential of hitting an external object, with a strong repelling magnet which would repel when it gets close to any external objects that are completely or partially made of ferrous components like iron, cobalt, nickel, etc. Therefore, the vehicle door/s wouldn't hit those external objects preventing any damage to those external objects or the vehicle itself. One or ordinary skill in the art would recognize that any other similar solutions can be used to prevent the vehicle door from hitting the external objects and that would be within the spirit and scope of the present invention.

One or ordinary skill in the art would recognize that this invention would be applicable to not only the manually operated vehicle doors but also to the automatic vehicle doors that open on their own and that would be within the spirit and scope of the present invention.

One or ordinary skill in the art would recognize that this invention would be applicable to not only the vehicle doors of traditional vehicles but also any autonomous self-driving vehicles and that would be within the spirit and scope of the present invention. In other words, this invention would be applicable to any type of vehicles that have doors or an opening to be able to come out of the vehicle.

One or ordinary skill in the art would recognize that this invention would be applicable to all vehicles that have doors regardless of how those doors open (for example: doors that open externally, open internally, on the side, on the top, on the bottom, etc) and all of those would be within the spirit and scope of the present invention.

One or ordinary skill in the art would recognize that this invention would be applicable to each and every door of the vehicle (for example: driver door, front passenger door, rear passengers doors, side doors, back door, front door, etc) and all of those would be within the spirit and scope of the present invention.

One or ordinary skill in the art would recognize that throughout this specification oncoming traffic can be any moving object or person that can come and hit the vehicle door. For example: another vehicle, cyclist, motorbike, scooter, people, etc. In addition, throughout this specification, oncoming traffic can be interchangeably referred as another vehicle or vehicle for ease of understanding.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined in this invention. For example, notwithstanding the fact that the elements of this invention are set forth below in a certain combination, it must be expressly understood that the embodiments includes other combinations of fewer, more or different elements, which are disclosed in above even when not initially presented in such combinations. A teaching that two elements are combined in a presented combination is further to be understood as also allowing for a combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of this invention, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in this invention or that a single element may be substituted for two or more elements in this invention. Although elements may be described above as acting in certain combinations, it is to be expressly understood that one or more elements from a combination can in some cases be excised from the combination and that the combination may be directed to a sub-combination or variation of a sub-combination.

Insubstantial changes from the presented subject matter as viewed by a person with ordinary skill in the art, now known or later devised, are expressly contemplated as being equivalently within the scope of this invention. Therefore, obvious substitutions now or later known to one with ordinary skill in the art are defined to be within the scope of the defined elements.

The invention is thus to be understood to include what is specifically illustrated and described above, what is conceptually equivalent, what can be obviously substituted and also what essentially incorporates the essential idea of the embodiments.

What is claims is:

1. A vehicle door safety apparatus comprising:
a door safety mechanism;
a processor connected to said door safety mechanism and configured to:
receive sensor data about the vehicle's external environment collected by a plurality of sensors integrated into the vehicle;
identify an object in the vehicle's external environment that represents a potential contact hazard when a door of said vehicle is opened;
determine, within a predetermined degree of probability, whether the object is likely to come into contact with the door when the door is opened, wherein the predetermined degree of probability is a defined probability, or range of probability, that the object will come into contact with the door when the door is opened; and
activate said door safety mechanism which prevents the door from extending into contact with said object when said processor determines that said object represents a contact hazard within said predetermined degree of probability; and
an artificial intelligence module configured to identify dangerous conditions based, at least in part, on prior hazardous incidents involving opening a door of said vehicle.

2. The vehicle door safety apparatus of claim 1, wherein said processor is further configured to:
cause said door safety mechanism to generate an alert directed to an occupant of said vehicle when the likelihood of contact with the object reaches or exceeds a predetermined threshold.

3. The vehicle door safety apparatus of claim 2, wherein said alert includes a visual indicator on said vehicle door.

4. The vehicle door safety apparatus of claim 1, wherein said processor is further configured to:
generate an alert directed to a person located outside of said vehicle.

5. The vehicle door safety apparatus of claim 4, wherein said alert includes a visual indicator disposed on said vehicle.

6. The vehicle door safety apparatus of claim 1, wherein said door safety mechanism prevents the door from opening when said likelihood of contact with the object reaches or exceeds a predetermined threshold.

7. The vehicle door safety apparatus of claim 1, wherein parameters defining a hazardous incident are preprogrammed into said module.

8. The vehicle door safety apparatus of claim 1, wherein said door safety mechanism locks the door when said likelihood of contact with the object reaches or exceeds a predetermined threshold.

9. The vehicle door safety apparatus of claim 1, wherein at least one of said plurality of sensors is configured to detect when an occupant of the vehicle is about to open the door.

10. The vehicle door safety apparatus of claim 1, wherein said door safety mechanism is deactivated when said object no longer represents a collision threat within the predetermined degree of probability.

11. The vehicle door safety apparatus of claim 1, wherein said door safety mechanism comprises a manual override that deactivates the door safety mechanism.

12. The vehicle door safety apparatus of claim 1, wherein said vehicle is an autonomous, self-driving vehicle.

13. A vehicle door safety apparatus comprising:
a door safety mechanism;
a processor connected to said door safety mechanism and configured to:
receive sensor data about the vehicle's external environment collected by a plurality of sensors integrated into the vehicle;
cause said door safety mechanism to generate an alert directed to an occupant of said vehicle when at least one of said plurality of sensors detects than an occupant of the vehicle is about to open the door of said vehicle and determines that within a predetermined degree of probability there is a likelihood of contact between said door and an object outside of said vehicle, wherein the predetermined degree of probability is a defined probability, or range of probability, that the object will come into contact with the door when the door is opened; and
an artificial intelligence module configured to identify dangerous conditions based, at least in part, on prior hazardous incidents involving opening a door of said vehicle.

14. The vehicle door safety apparatus of claim 13, wherein said vehicle is an autonomous, self-driving vehicle.

15. The vehicle door safety apparatus of claim 13, wherein said door safety mechanism prevents the door from opening when said likelihood of contact with the object reaches or exceeds a predetermined threshold.

16. The vehicle door safety apparatus of claim 13, further comprising an artificial intelligence module configured to identify dangerous conditions based, at least in part, on prior hazardous incidents involving opening a door of said vehicle, wherein parameters defining a hazardous incident are preprogrammed into said module.

17. The vehicle door safety apparatus of claim 13, wherein said door safety mechanism locks the door when said likelihood of contact with the object reaches or exceeds a predetermined threshold.

18. The vehicle door safety apparatus of claim 13, wherein said door safety mechanism is deactivated when said object no longer represents a collision threat within the predetermined degree of probability.

19. The vehicle door safety apparatus of claim 13, wherein said door safety mechanism deactivates the alert when at least one of said plurality of sensors detects that there is no longer a collision threat between said door and an object outside of said vehicle.

20. A vehicle door safety apparatus comprising:
a door safety mechanism; and
a processor connected to said door safety mechanism and configured to:
receive sensor data about the vehicle's external environment collected by a plurality of sensors integrated into the vehicle;
cause said door safety mechanism to generate an alert directed to a person located outside of said vehicle when at least one of said plurality of sensors detects than an occupant of the vehicle is about to open the door of said vehicle and determines that within a predetermined degree of probability there is a likelihood of contact between said door and said person, or an object associated with said person, wherein the predetermined degree of probability is a defined probability, or range of probability, that the object will come into contact with the door when the door is opened; and
an artificial intelligence module configured to identify dangerous conditions based, at least in part, on prior hazardous incidents involving opening a door of said vehicle.

21. The vehicle door safety apparatus of claim 20, wherein said vehicle is an autonomous, self-driving vehicle.

22. The vehicle door safety apparatus of claim 20, wherein the said alert can also be directed to another self-driving vehicle wherein there is a likelihood of contact between said door and said another self-driving vehicle.

23. A vehicle door safety system comprising:
a vehicle;
a processor;
a plurality of sensors embedded in said vehicle; and
non-volatile memory comprising computer readable instructions stored therein, wherein said instructions cause said processor to;
receive sensor data about the vehicle's external environment from said plurality of sensors;
identify an object in the vehicle's external environment that represents a potential contact hazard when a door of said vehicle is opened;
determine, within a predetermined degree of probability, whether the object is likely to come into contact with the door when the door is opened, wherein the predetermined degree of probability is a defined probability, or range of probability, that the object will come into contact with the door when the door is opened; and
activate a door safety mechanism that prevents the door from extending into contact with said object when said processor determines that said object represents a contact hazard within a predetermined degree of probability; and an artificial intelligence module configured to identify dangerous conditions based, at least in part, on prior hazardous incidents involving opening a door of said vehicle.

24. The vehicle door safety system of claim 23, wherein said door safety mechanism prevents the door from opening when said likelihood of contact with the object reaches or exceeds a predetermined threshold.

25. The vehicle door safety system of claim 23, further comprising an artificial intelligence module configured to identify dangerous conditions based, at least in part, on prior hazardous incidents involving opening a door of said vehicle, wherein parameters defining a hazardous incident are preprogrammed into said module.

26. The vehicle door safety system of claim 23, wherein said door safety mechanism locks the door when said likelihood of contact with the object reaches or exceeds a predetermined threshold.

27. The vehicle door safety system of claim 23, wherein said door safety mechanism is deactivated when said object no longer represents a collision threat within the predetermined degree of probability.

28. The vehicle door safety system of claim 23, wherein said door safety mechanism deactivates the alert when at least one of said plurality of sensors detects that there is no longer a collision threat between said door and an object outside of said vehicle.

* * * * *